United States Patent
Mylaraswamy (10) Patent No.: US 8,126,598 B2
(45) Date of Patent: Feb. 28, 2012

(54) METHOD AND APPARATUS FOR DATA DOWNLOAD FROM A MOBILE VEHICLE

(75) Inventor: Dinkar Mylaraswamy, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 973 days.

(21) Appl. No.: 12/112,237

(22) Filed: Apr. 30, 2008

(65) Prior Publication Data

US 2009/0276589 A1 Nov. 5, 2009

(51) Int. Cl.
*G01C 23/00* (2006.01)
*G01C 21/00* (2006.01)

(52) U.S. Cl. .............................. 701/3; 701/200; 701/23

(58) Field of Classification Search .......... 701/1, 23–25, 701/3, 200; 340/945, 961, 952; 342/29–30, 342/33
See application file for complete search history.

(56) References Cited

U.S. PATENT DOCUMENTS

| | | | |
|---|---|---|---|
| 4,634,403 A | 1/1987 | Peabody et al. | |
| 5,633,707 A | 5/1997 | Seemann | |
| 6,061,613 A | 5/2000 | Zyburt et al. | |
| 6,220,099 B1 | 4/2001 | Marti et al. | |
| 6,378,387 B1 | 4/2002 | Froom | |
| 6,496,755 B2 | 12/2002 | Wallach et al. | |
| 6,658,325 B2 | 12/2003 | Zweig | |
| 6,748,292 B2 | 6/2004 | Mountz | |
| 6,757,521 B1 | 6/2004 | Ying | |
| 6,836,701 B2 | 12/2004 | McKee | |
| 6,895,301 B2 | 5/2005 | Mountz | |
| 6,947,742 B1 * | 9/2005 | Corrigan | 455/431 |
| 6,950,722 B2 | 9/2005 | Mountz | |
| 6,975,923 B2 | 12/2005 | Spriggs | |
| 6,981,418 B1 | 1/2006 | Mueller | |
| 7,054,716 B2 | 5/2006 | McKee et al. | |
| 7,103,456 B2 | 9/2006 | Bloch et al. | |
| 7,131,136 B2 | 10/2006 | Monroe | |
| 7,149,612 B2 | 12/2006 | Stefani et al. | |
| 7,174,238 B1 | 2/2007 | Zweig | |
| 7,271,702 B2 | 9/2007 | Patil et al. | |
| 7,298,275 B2 | 11/2007 | Brandt et al. | |
| 2003/0089183 A1 | 5/2003 | Jacobsen et al. | |
| 2004/0068415 A1 | 4/2004 | Solomon | |
| 2007/0124345 A1 * | 5/2007 | Heinz et al. | 707/204 |

* cited by examiner

*Primary Examiner* — Yonel Beaulieu
(74) *Attorney, Agent, or Firm* — Fogg & Powers LLC (57) ABSTRACT

A method and apparatus are provided for autonomous data download. The method includes the steps of navigating an autonomous data download device to a first data storage device located in a mobile vehicle and parking the autonomous data download device adjacent to the first data storage device. The method further includes the steps of connecting the autonomous data download device to the first data storage device and downloading data from the first data storage device to the autonomous data download device. The method thereafter includes the steps of navigating the autonomous data download device to a location determined to be suitable for transmission of the data and transmitting the data from the autonomous data download device to a second data storage device after determining that the autonomous data download device has reached the location determined to be suitable for transmission of the data.

20 Claims, 7 Drawing Sheets

METHOD AND APPARATUS FOR DATA DOWNLOAD FROM A MOBILE VEHICLE

FIELD OF THE INVENTION

The present invention generally relates to automatic data download systems, and more particularly relates to an improved method and apparatus for accessing and downloading data from a mobile vehicle.

BACKGROUND OF THE INVENTION

Mobile vehicles, such as airplanes, routinely collect data from a number of sensors. As data storage may be limited, it is desirable to routinely download such sensor data to a larger storage device, such as mass storage media (e.g., CD-ROMs) or computing devices (e.g., computers), which are not resident in the mobile vehicle. Conventionally, these routine downloads are handled by manual connection of a data download devices (e.g., a laptop computer or personal digital assistant (PDA)) or wireless transmission of the data using available wireless protocols. Sometimes, however, these conventional data download techniques are hampered by either the requirement of a person to accomplish the data download or by the mobile vehicle, or by both. For example, the sensor data may be collected and stored in a data storage device located in an inaccessible area of the mobile vehicle or an area of the mobile vehicle where access is difficult. Alternatively, accurate wireless transmission of the data or manual retrieval of the data may be hampered by the vehicle itself, either due to the mobility of the vehicle (i.e., an airplane which is fairly constantly in use) or the structure of the vehicle and the location of the data storage device therein.

Thus, what is needed is an alternative method and apparatus for accessing and downloading data from a mobile vehicle which accommodates the mobility of the vehicle and the accessibility of the data storage device within the mobile vehicle while not requiring wireless transmission of the data form inside the mobile vehicle. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method is provided for autonomous data download. The method includes the steps of navigating an autonomous data download device to a first data storage device located in a mobile vehicle and parking the autonomous data download device adjacent to the first data storage device. The method further includes the steps of connecting the autonomous data download device to the first data storage device and downloading data from the first data storage device to the autonomous data download device. The method thereafter includes the steps of navigating the autonomous data download device to a location determined to be suitable for transmission of the data and transmitting the data from the autonomous data download device to a second data storage device after determining that the autonomous data download device has reached the location determined to be suitable for transmission of the data.

An autonomous data download device is provided for downloading data from a first data storage device in a mobile vehicle. The autonomous data download device includes a drive mechanism, a location sensing device, a controller, a memory and a data connection device. The drive mechanism propels the autonomous data download device and includes a steering mechanism for navigating the autonomous data download device within the mobile vehicle. The location sensing device determines a location of the autonomous data download device within the mobile vehicle and generates a location signal in response thereto. The controller for provides a drive signal to the drive mechanism for propelling the autonomous data download device and is coupled to the location sensing device for generating a steering signal in response to the location signal and predetermined route data, the controller providing the steering signal to the steering mechanism of the drive mechanism. The memory stores downloaded data. And the data connection device couples the memory to the first data storage device in response to a connection signal provided from the controller, the data connection device thereafter downloading the downloaded data from the first data storage device to the memory of the autonomous data download device.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
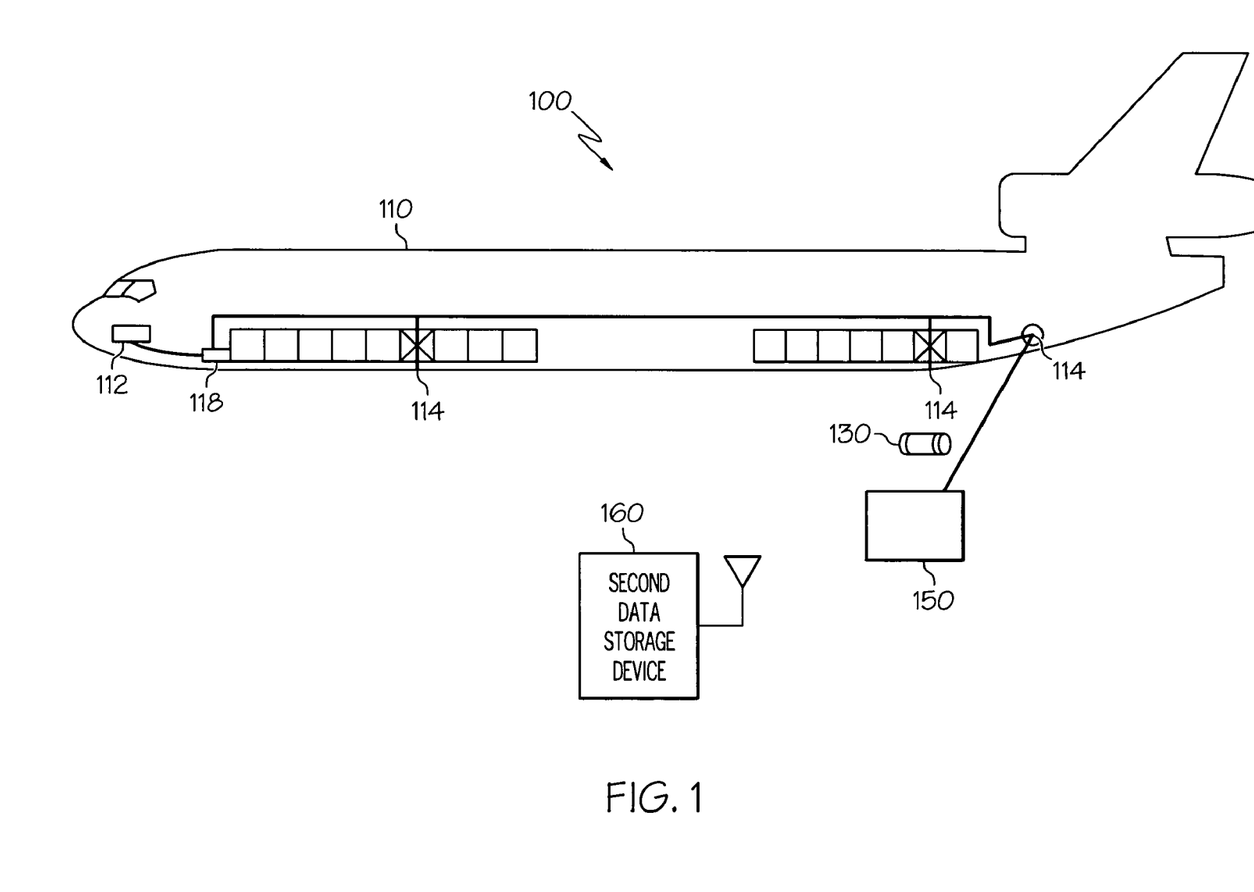
FIG. 1 illustrates a system for autonomous download of data from a moving vehicle in accordance with an embodiment of the present invention.

Referring to FIG. 1, a system 100 for autonomous download of data from a mobile vehicle 110, such as an airplane, includes a self-propelled autonomous data download device 130, such as a data scavenging robot, which navigates to and downloads data from a first data storage device 112 inside the mobile vehicle 110 and navigates to a location 150 suitable for transmission of data. The location 150 could be a location suitable for wireless transmission of data or could be an internet access point at which the autonomous data download device 130 could connect to the World Wide Web for uploading data thereto. Upon reaching the location 150, the autonomous data download device 130 transmits the data downloaded from the first data storage device 112 to a second storage device 160 (e.g., wirelessly or via the World Wide Web).

In order to retrieve download data from the first data storage device 112, the autonomous data download device 130 is provided to an access point 114 to the mobile vehicle 110, such as a cargo door, and navigates along a predetermined travel path 116 inside the mobile vehicle 110 from the access point to the first data storage device 112. The predetermined travel path 116 can be marked in a sensible manner (e.g., a wire or other material which produces a predetermined response in the autonomous data download device 130 can be used to trace the predetermined travel path 116) or have visible "signposts" for the autonomous data download device 130 to follow (e.g., distinctive, highly visible signs which mark the predetermined travel path 116 and can be "seen" by the autonomous data download device 130).

After downloading the data from the first data storage device, the autonomous data download device 130 navigates along the predetermined travel path 116 in order to return to the access point 114 for exiting the mobile vehicle 110. To prevent damage to the autonomous data download device 130, whenever the autonomous data download device 130 detects motion of the mobile vehicle 110, such as an airplane taxiing for takeoff, the autonomous data download device 130 navigates to a predetermined safe travel location 118 inside the mobile vehicle 110 and parks at the predetermined safe travel location 118 until the mobile vehicle ceases moving. The predetermined safe travel location 118 is a location away from items, such as cargo, which may move or shift during travel, and may be a sheltered location. When the motion of the mobile vehicle 110 is no longer detected, the autonomous data download device 130 once again begins to navigate along the predetermined travel path 116 to either travel to the first data storage device 112 for downloading the data or travel to the access point 114 to exit the mobile vehicle 110.

Figure 2:
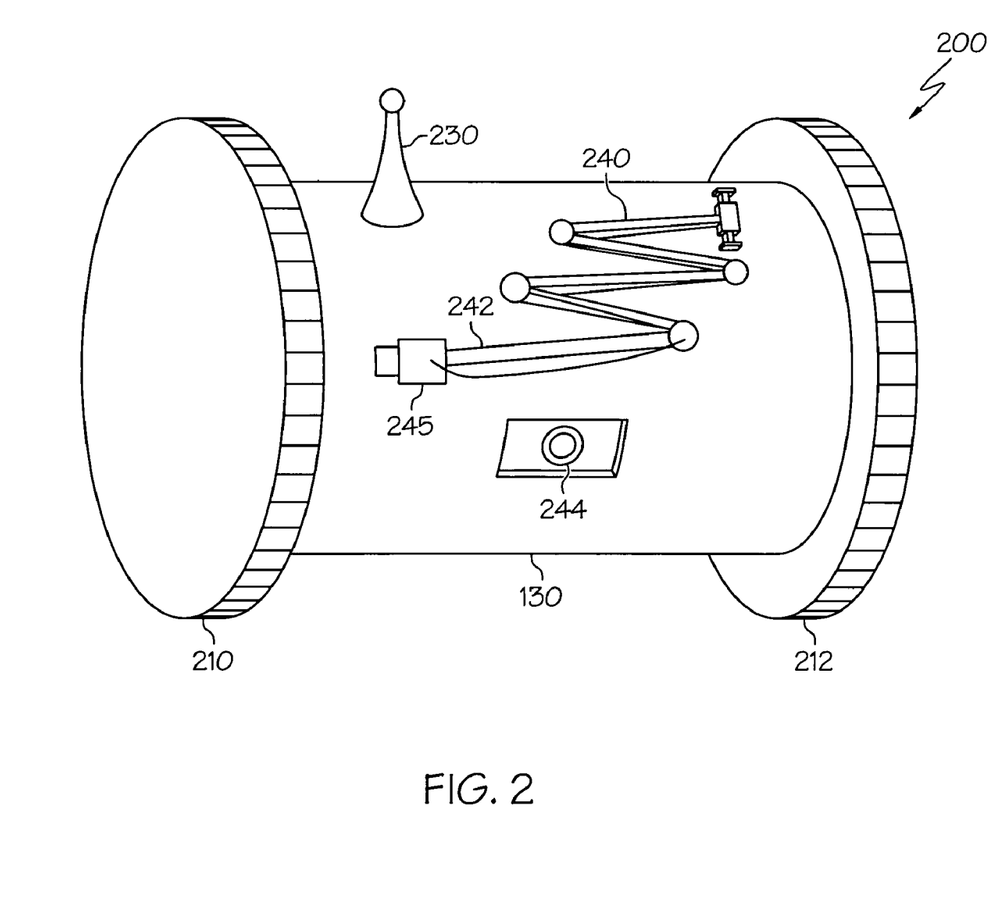
FIG. 2 is a top front left perspective view illustrating the autonomous data download device operating in the system of FIG. 1 in accordance with the present embodiment.

Referring to FIG. 2, a top front left perspective view 200 illustrates the autonomous data download device 130 in accordance with the present embodiment. Two independently driven wheels 210, 212 propel the autonomous data download device 130. The independently driven wheels 210, 212 allow for steering the autonomous data download device 130 for navigation thereof.

An antenna 230 receives and transmits radio frequency (RF) signals for communication with, for example, the second data storage device 160 (FIG. 1). A data connection device 240 is also provided for coupling the autonomous data download device 130 to a data storage device, such as the first data storage device 112, or to an internet access point. The data connection device 240 includes a robotic arm 242 including, for example, foldable linkages for extending the data connection device 240. A digital camera 244, such as a webcam, detects visual information which provides feedback signals to the autonomous data download device 130 for maneuvering the robotic arm 242. The robotic arm 242 includes an external device plug 245, such as a universal serial bus (USB) connector, the autonomous data download device 130 maneuvering the robotic arm 242 to connect the external device plug 245 to the data storage device (e.g., the first data storage device 112) or internet access point.

Figure 3:
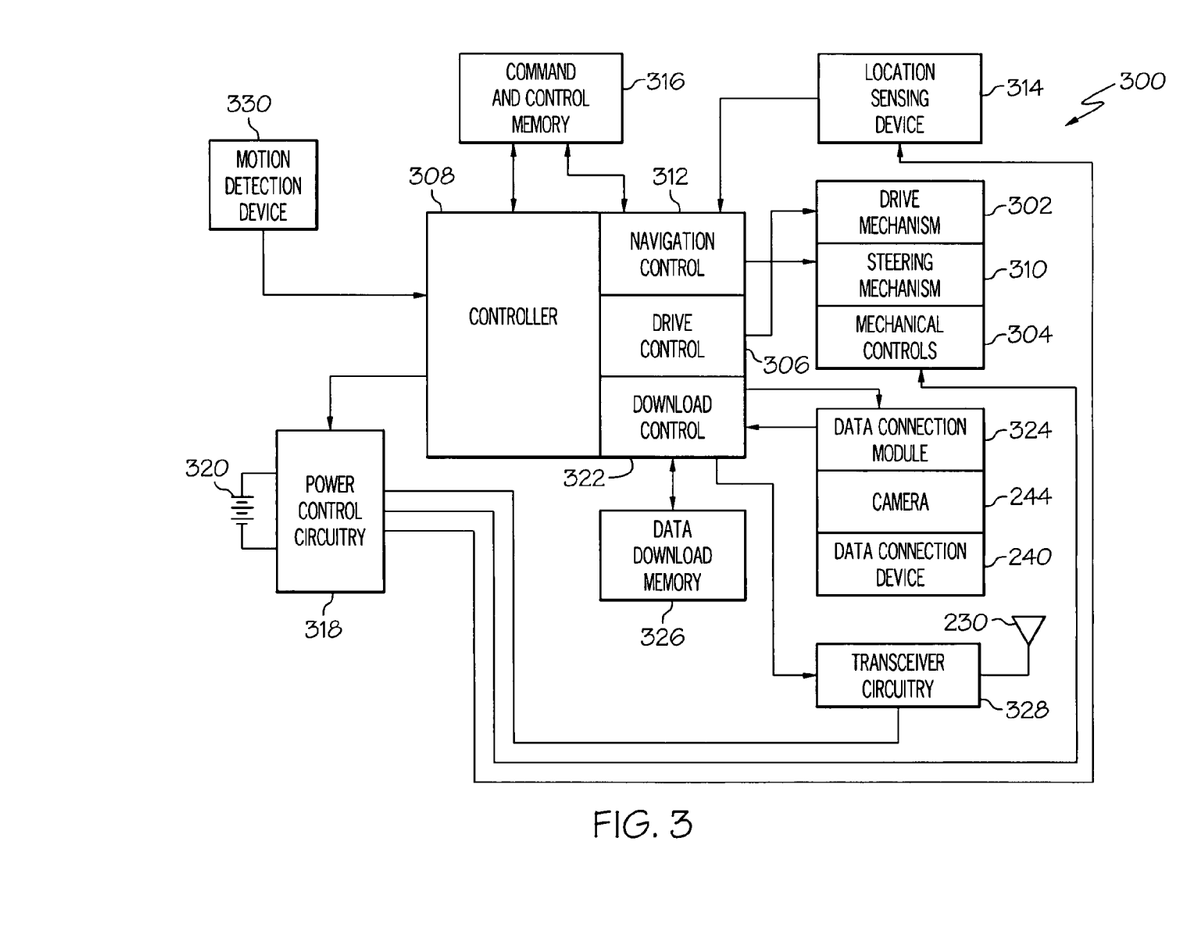
FIG. 3 is a block diagram illustrating an autonomous data download device of FIG. 2 in accordance with the present embodiment.

Referring to FIG. 3, a block diagram 300 illustrates the autonomous data download device 130. A drive mechanism 302 includes the two independently driven wheels 210, 212 which propel the autonomous data download device 130, along with mechanical controls 304 for driving the wheels 210, 212 and software control for receiving a drive signal from a drive control block 306 of a controller 308 and, in response to the drive signal, providing appropriate signals to the mechanical controls 304 for propelling the autonomous data download device 130. The drive mechanism 302 also includes a steering mechanism 310 which receives a steering signal from a navigation control block 312 of the controller 308, the steering mechanism providing, in response to the steering signal, appropriate signals to the drive mechanism 302 for navigating the autonomous data download device 130. As the wheels 210, 212 are independently driven, the drive mechanism 302 can provide appropriate signals to the mechanical controls 304 for independent drive of the wheels 210, 212, thereby steering the autonomous data download device 130.

When inside the mobile vehicle 110, the navigation control 312 navigates the autonomous data download device 130 along the predetermined travel path 116. This is accomplished by a location sensing device 314 generating a location signal in response to sensing a location of the autonomous data download device 130 (e.g., sensing that the autonomous data download device 130 is either on the predetermined travel path 116 or so far to the right or left of the predetermined travel path 116) and providing the location signal to the navigation control block 312. A command and control memory 316 stores control data for operation of the autonomous data download device 130, including predetermined route data. The navigation control block 312 retrieves the predetermined route data from the command and control memory 316 and compares the location signal from the location sensing device 314 to the predetermined route data to generate the steering signal for navigating the autonomous data download device 130 along the predetermined travel path 116.

When the controller 308, in response to the location signal from the location sensing device 314, determines that the autonomous data download device 130 has arrived at the first data storage device 112 in the mobile vehicle 110, the controller 308 provides a power save signal to power control circuitry 318 to "park" the autonomous data download device 130. The power control circuitry 318 is coupled to an energy storage device 320, such as a battery, and controls the power provided to the components of the autonomous data download device 130, such as the location sensing device 314 and the drive mechanism 302. The controller 308 parks the autonomous data download device 130 by providing a parking power save signal to the power control circuitry 318 to cease providing power to the drive mechanism 302. For additional power conservation benefits, the power control circuitry 318 can also cease providing power to the location sensing device 314 in response to the parking power save signal.

The controller 308 then activates a download control block 322 thereof for retrieving and downloading data from the data storage device 112 and provides a download signal to the power control circuitry 318, the power control circuitry providing power to a data connection module 324 for activation thereof. The data connection module 324 includes the data connection device 240 (which includes the robotic arm 242 and the external device plug 245), the camera 242, mechanical controls for maneuvering the robotic arm 242, and software controls for receiving the feedback signals from the camera 244 and generating maneuvering signals in response thereto, the software controls also capable of communicating with the data storage device 112 for downloading the data therefrom. Thus, after the controller 308 parks the autonomous data download device 130 at the data storage device 112, the download control block 322 generates a connection signal and provides it to the data connection module 324. The data connection module 324 then maneuvers the robotic arm 242 to connect the external device plug 245 to a socket on the data storage device 112 (e.g., connect a USB plug on the robotic arm 242 to a USB socket on the data storage device 112) and communicates with the data storage device 112 for authentication for data download. Once authenticated, the data storage device 112 downloads data to the data connection module 324, the data connection module 324 providing the downloaded data to the download control block 322 which stores the downloaded data in a data download memory 326.

After the data is downloaded from the data storage device 112 and stored in the data download memory 326, the data connection module 324 disconnects from the data storage device 112 and returns the robotic arm 242 to its storage position so that the autonomous data download device 130 can once again navigate through the mobile vehicle 110. The controller 308 provides a power save signal to the power control circuitry 318 which cases to provide power to the data connection module 324. In addition, the controller 308 provides an activation signal to the power control circuitry 318 to begin providing power to the location sensing device 314 and the drive mechanism 302 so that the autonomous data download device 130 can begin navigating through the mobile vehicle 110, through one of the access points 114, and to the location 150 that is determined to be suitable for transmission of the downloaded data to the second data storage device 160. If the data storage device 160 is a data download site connected to the World Wide Web and the location 150 is an internet access point, the data connection module 324 is utilized to connect to the World Wide Web and access the data download site in accordance with predetermined information stored in the command and control memory 316. Once the downloaded data is transmitted to the data storage device 160, the downloaded data is deleted from the memory 326.

Alternatively, the data storage device 160 could be wirelessly accessible. If the mobile vehicle 110 is an airplane or other vehicle which is constructed of metal and/or other radio frequency interfering materials, the autonomous data download device 130 must navigate to the location 150 suitable for wireless transmission of the downloaded data. The location 150 could be at one of the access points 114 or outside the mobile vehicle 110. Once the controller 308 determines that the autonomous data download device 130 has reached the location 150 determined to be suitable for wireless transmission of the downloaded data, the controller 308 parks the autonomous data download device 130 as described above and provides a transmission signal to the power control circuitry 318 for activation of transceiver circuitry 328 by providing power thereto. The download control block 322 then controls the transceiver circuitry 328 to wirelessly couple to the data storage device 160. Once coupled thereto, the download control block 322 retrieves the downloaded data from the memory 326 and provides appropriate signaling to the transceiver circuitry 328 for transmitting the data from the autonomous data download device 130 to the data storage device 160. Once the downloaded data is transmitted to the data storage device 160, the downloaded data is deleted from the memory 326 and the transceiver circuitry 328 is deactivated.

In accordance with the present embodiment, the autonomous data download device 130 also includes a motion detection device 330. When the motion detection device 330 detects motion of the mobile vehicle 110, the motion detection device generates a vehicle movement signal and provides the vehicle movement signal to the controller 308. When the controller 308 receives the vehicle movement signal while the controller 308 is navigating the autonomous data download device 130 within the mobile vehicle 110, the controller 308 signals the navigation control block 312 to navigate the autonomous data download device 130 to the predetermined safe travel location 118 within the mobile vehicle 110, location data signifying the predetermined safe travel location 118 being stored in the command and control memory 316 and the navigation control block determining a route to the predetermined safe travel location 118 in response to such location data. Upon arriving at the predetermined safe travel location, the controller 308 parks the autonomous data download device 130 until the movement signal is no longer received from the motion detection device 330, signaling that motion of the mobile vehicle 110 is no longer detected. When motion of the mobile vehicle 110 is no longer detected, the autonomous data download device 130 resumes its travel, by the controller 308 signaling the navigation control block 312 to navigate to the destination to which the autonomous data download device 130 was heading before the motion of the mobile vehicle 110 was detected (i.e., either the first data storage device 112 or one of the access points 114 for travel outside the mobile vehicle 110 to the location 150 deemed to be suitable for transmission of the downloaded data to the second data storage device 160).

Figure 4:
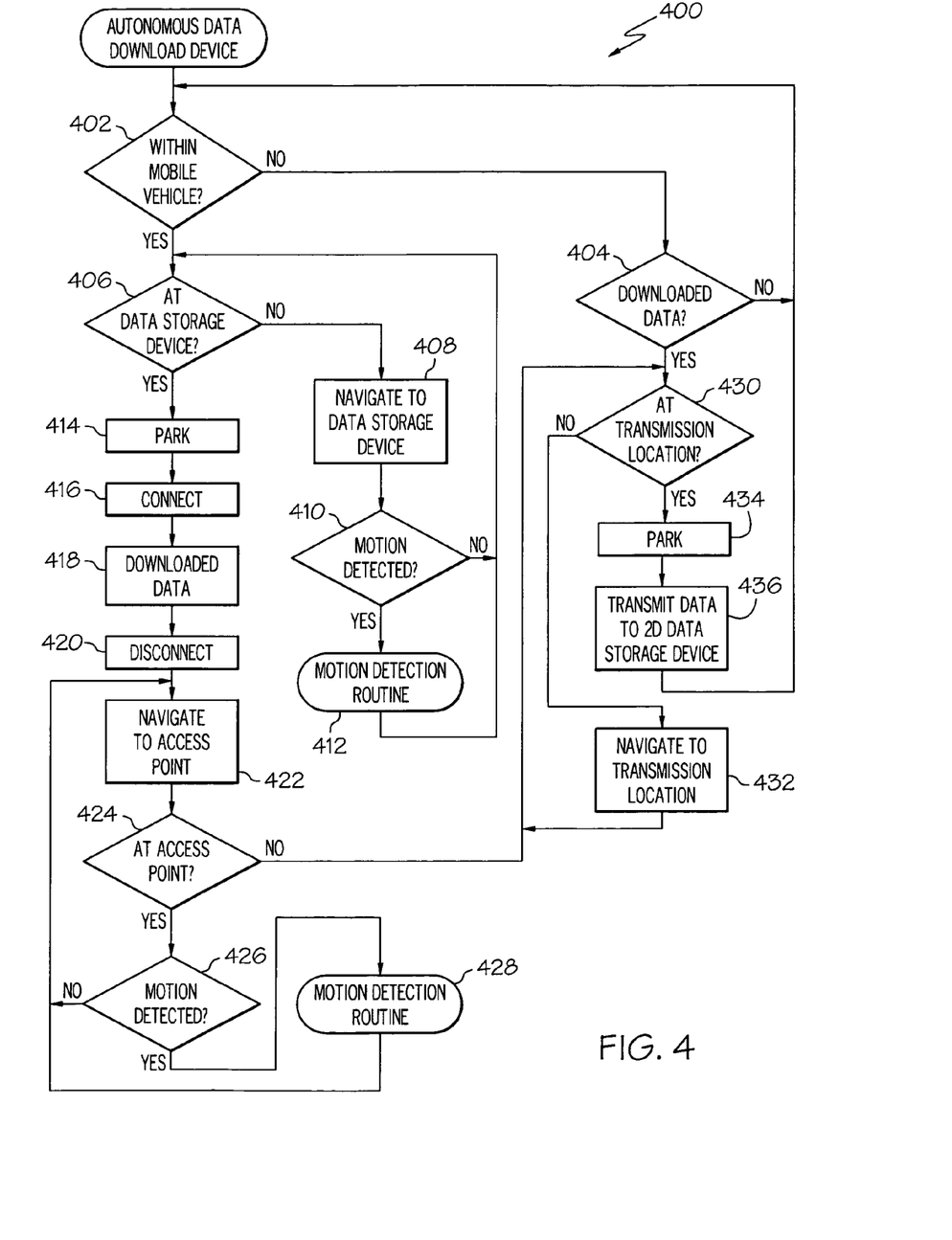
FIG. 4 is a flowchart of the operation of a controller of the autonomous data download device of FIG. 2 in accordance with the present embodiment.

Referring next to FIG. 4, a flowchart 400 of the operation of the controller 308 in accordance with the present embodiment begins by determining 402 whether the autonomous data download device 130 is within the mobile vehicle 110 and, if not within the mobile vehicle 110, determining 404 whether the data download memory 326 has downloaded data stored therein. If the controller 308 determines 402 that the autonomous data download device 130 is not within the mobile vehicle 110 and determines 404 that no downloaded data is stored in the data download memory 326, processing waits until either of the decision steps 402 or 404 is positive.

When the controller 308 determines 402 that the autonomous data download device 130 is within the mobile vehicle 110, the controller 308 determines 406 in response to the location signal from the location sensing device 314 whether the autonomous data download device 130 is at the first data storage device 112. If the autonomous data download device 130 is determined 406 to not be at the first data storage device 112, the controller 308 signals the navigation control block 312 to navigate 408 the autonomous data download device 130 along the predetermined travel path 116. Processing then determines whether movement of the mobile vehicle 110 is detected 410 (i.e., whether a vehicle movement signal is received by the controller 308 from the motion detection device 330). As long as no movement of the mobile vehicle 110 is detected 410, the navigation control block 312 navigates 408 the autonomous data download device 130 along the predetermined travel path 116 until the autonomous data download device 130 reaches 406 the first data storage device 112. If movement is detected 410, the controller 308 performs a motion detection routine 412, after which processing returns to navigate 408 the autonomous data download device 130 along the predetermined travel path 116 until the autonomous data download device 130 reaches 406 the first data storage device 112.

When the autonomous data download device 130 reaches 406 the first data storage device 112, the controller parks 414 the autonomous data download device 130 at the data storage device 112 in the manner described above. Thereafter, the controller connects 416 the autonomous data download device 130 to the data storage device 112 and downloads 418 the data therefrom. When the data is downloaded 418, the controller disconnects 420 the autonomous data download device 130 from the data storage device 112 and signals the navigation control block 312 to navigate 422 the autonomous data download device 130 along the predetermined travel path 116 until the autonomous data download device 130 reaches 424 one of the access points 114 in order to exit the mobile vehicle 110. If, while navigating 422 to one of the access points 114, motion of the mobile vehicle 110 is detected 426, the motion detection routine, as described below, is performed 428, after which navigation 422 resumes. If no motion of the mobile vehicle 110 is detected 426, the navigation control block 312 navigates 422 the autonomous data download device 130 along the predetermined travel path 116 until it reaches 424 one of the access points 114.

When the autonomous data download device 130 reaches 424 one of the access points 114, the controller determines 430 if the autonomous data download device 130 is at the location 150 determined to be suitable for transmission of the downloaded data to the second data storage device 160. Likewise, if the controller 308 determines 402 that the autonomous data download device 130 is not within the mobile vehicle 110 and that the data download memory 326 includes downloaded data 404, the controller 308 also determines 430 if the autonomous data download device 130 is at the location 150 determined to be suitable for transmission of the downloaded data to the second data storage device 160.

If the autonomous data download device 130 is not at the location 150 determined to be suitable for transmission of the downloaded data 430, the controller 308 signals the navigation control block 312 to navigate 432 the autonomous data download device 130 to the location 150. When the controller 308 determines 430 that the autonomous data download device 130 has reached 430 the location 150, the controller 308 parks 434 the autonomous data download device 130 at the location 150 and signals the download control block 322 to connect to the second data storage device 160 and transmit the downloaded data thereto 436. When the downloaded data has been transmitted 436, processing returns for the controller 308 to determine 402 whether the autonomous data download device 130 is within the mobile vehicle 110 and whether the data download memory 326 includes downloaded data 404.

It is apparent to those skilled in the art that additional steps could be included in the flow diagram 400 to either show more detail or additional variants for the steps shown or to include additional steps (e.g., navigating the autonomous data download device 130 when it is outside the mobile vehicle 110) outside the scope of the present embodiment.

Figure 5:
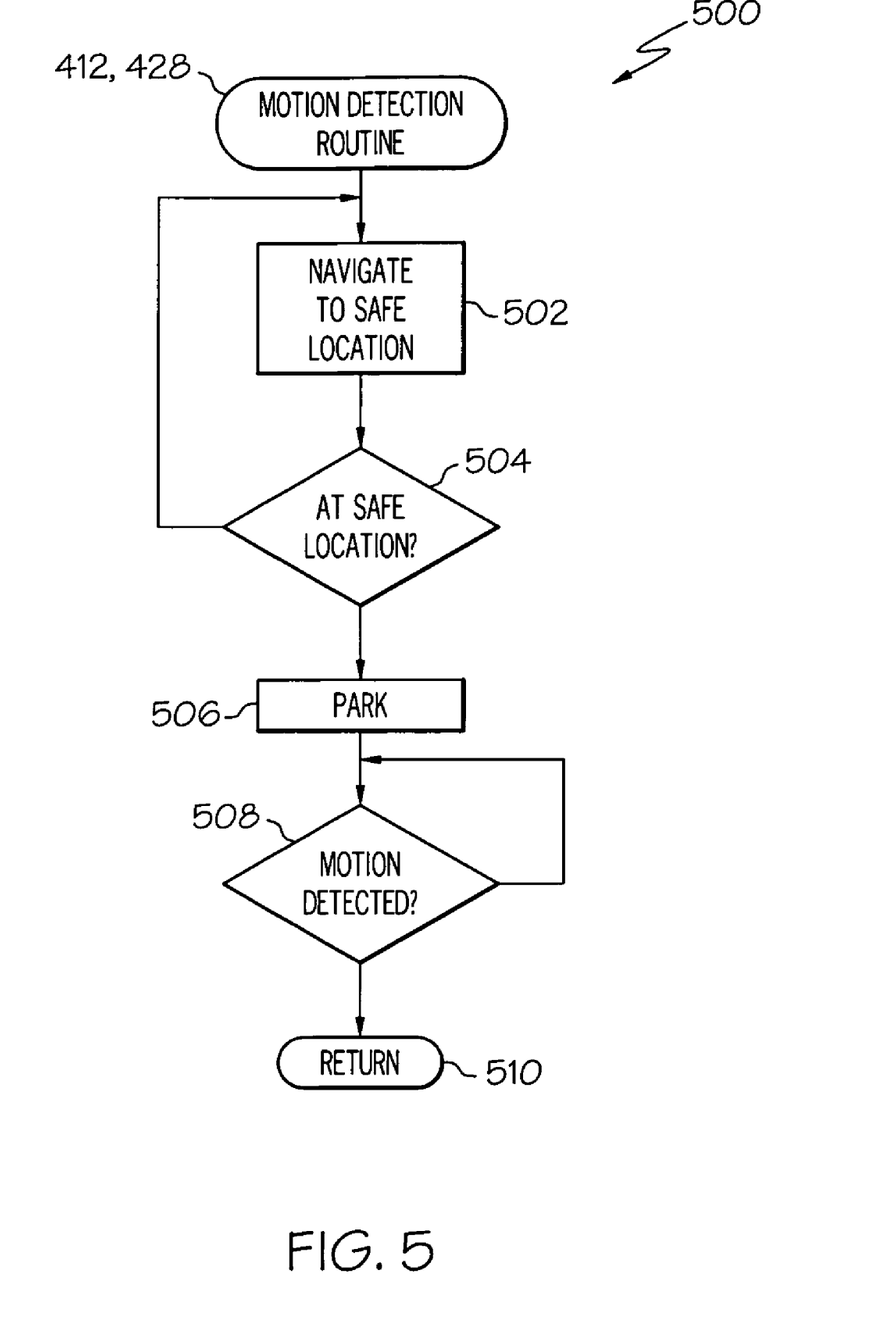
FIG. 5 a flowchart of the operation of the controller of the autonomous data download device of FIG. 2 during a motion detected routine in accordance with the present embodiment

Referring to FIG. 5, a flowchart 500 of the operation of the controller 308 during the motion detected routine 412, 428 in accordance with the present embodiment begins by the controller 308 signaling the navigation control block 312 to navigate 502 the autonomous data download device 130 to the predetermined safe travel location 118. When the autonomous data download device 130 reaches 504 the predetermined safe travel location 118, the controller 308 parks 506 the autonomous data download device 130 at the predetermined safe travel location 118, thereby conserving power and protecting the autonomous data download device 130 while motion of the mobile vehicle 110 is detected 508. When motion of the mobile vehicle 110 is no longer detected 508, processing returns 510 to the flow of flowchart 400 (e.g., processing of the controller 308 returns to either step 412 or step 428).

Figure 6:
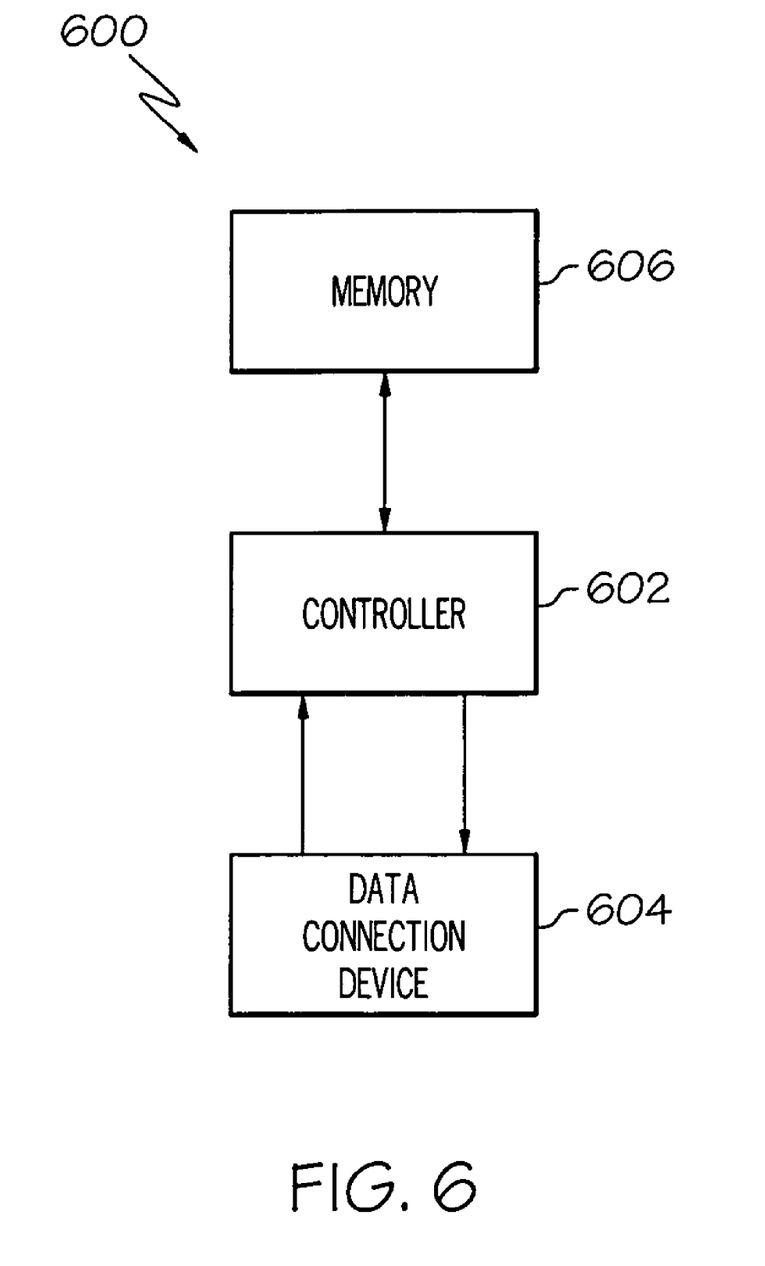
FIG. 6 is a block diagram illustrating a data storage device of the mobile vehicle of FIG. 1 in accordance with the present embodiment.
Figure 7:
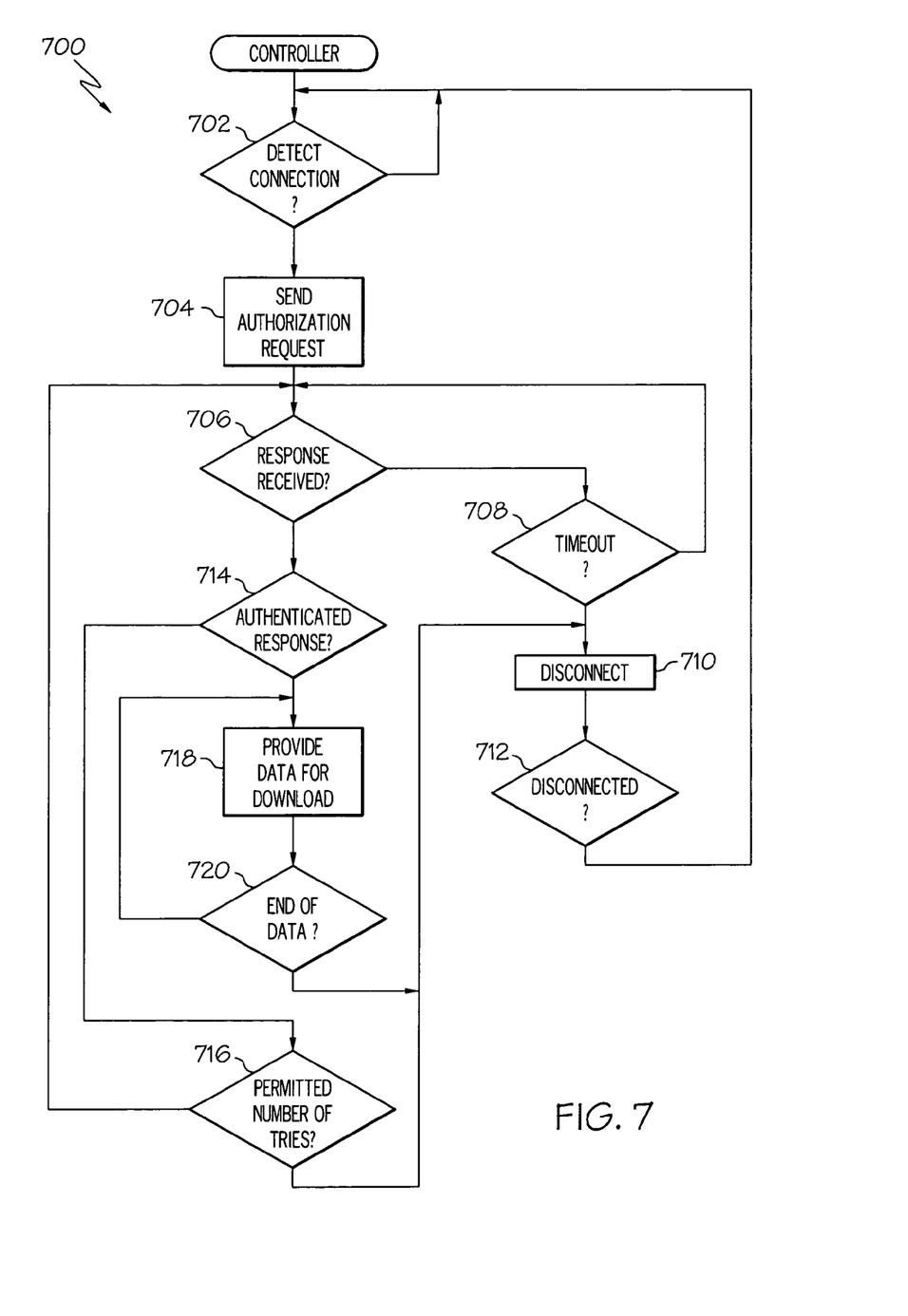
FIG. 7 is a flowchart of the operation of a controller of the data storage device of FIG. 6 in accordance with the present embodiment.

FIG. 6 is a block diagram 600 illustrating a portion of the first data storage device 112 in accordance with the present embodiment. The data storage device 112 includes a controller 602 coupled to a data connection device 604 which includes an external device socket, such as a USB socket, for connecting to the autonomous data download device 130. The controller 602 is also coupled to a memory 606 for storing data therein and retrieving data therefrom. FIG. 7 illustrates a flowchart 700 of a data download operation of the controller 602 in accordance with the present embodiment. The controller 602 awaits detection 702 of connection of the autonomous data download device 130 thereto before initiating data download.

When the controller 602 determines that the autonomous data download device 130 is connected to the data connection device 604 (i.e., determines that the external device plug 245 is connected to the external device socket of the data connection device 604), the controller 602 verifies that the autonomous data download device 130 is authorized to download data from the data storage device 112. To verify authorization of the autonomous data download device 130, the controller 602 sends an authorization request 704. If no response is received 706 from the autonomous data download device 130 within a predetermined timeout period 708, the controller 602 disconnects the data storage device 112 from the autonomous data download device 130. This could be accomplished by the controller 602 signaling the data connection device 604 to physically disconnect. Alternatively, the controller 602 could cease providing any signals to the data connection device 604, thereby effectively disconnecting the data storage device 112 from the autonomous data download device 130. After confirming disconnection 712, processing returns to await detection 702 of a subsequent connection to the data connection device 604.

When a response is received 706 within the predetermined timeout period, authentication of the autonomous data download device 130 continues by the controller 602 verifying that the response is an authenticated response 714. If the response is not an authenticated response 714, the controller 602 determines whether the autonomous data download device 130 has provided more than a permitted number of attempted authenticated responses 716. If the autonomous data download device 130 has not provided more than a permitted number of attempted authenticated responses 716, processing returns to await a subsequent response 706. If the autonomous data download device 130 has provided more than the permitted number of attempted authenticated responses 716 without providing an authenticated response 714, the controller 602 determines that the autonomous data download device 130 is not authorized to download data from the data storage device 112 and disconnects 710 the data storage device 112 from the autonomous data download device 130.

When an authenticated response is received 714, the controller determines that the autonomous data download device 130 is authorized to download data from the data storage device 112 and provides data 718 to the data connection device 604 for downloading to the autonomous data download device 130. When all of the data is downloaded 720, the controller 602 disconnects 710 the data storage device 112 from the autonomous data download device 130. After confirming disconnection 712, processing returns to await a subsequent detection of a connection 702 to the data connection device 604.

Thus it can be seen that a method and apparatus for accessing and downloading data from a mobile vehicle which accommodates the mobility of the vehicle and the accessibility of the data storage device within the mobile vehicle while not requiring wireless transmission of the data from inside the mobile vehicle has been provided. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for autonomous data download comprising the steps of:
    navigating an autonomous data download device to a first data storage device located in a mobile vehicle;
    parking the autonomous data download device adjacent to the first data storage device;
    connecting the autonomous data download device to the first data storage device;
    downloading data from the first data storage device to the autonomous data download device;
    navigating the autonomous data download device to a location determined to be suitable for transmission of the data; and
    transmitting the data from the autonomous data download device to a second data storage device after determining that the autonomous data download device has reached the location determined to be suitable for transmission of the data.

2. The method in accordance with claim 1 wherein the step of navigating the autonomous data download device to the first data storage device comprises the steps of:
    navigating the autonomous data download device to a predetermined safe travel location inside the mobile vehicle in response to detecting motion of the mobile vehicle while inside the mobile vehicle; and
    parking the autonomous data download device at the predetermined safe travel location inside the mobile vehicle.

3. The method in accordance with claim 2 wherein the step of navigating the autonomous data download device to the first data storage device further comprises the step of the autonomous data download device, when parked at the predetermined safe travel location inside the mobile vehicle, determining whether the motion of the mobile vehicle is still detected.

4. The method in accordance with claim 3 wherein the step of navigating the autonomous data download device to the first data storage device further comprises the step of navigating the autonomous data download device to the first data storage device in response to determining that the motion of the mobile vehicle is not detected.

5. The method in accordance with claim 1 wherein the step of navigating the autonomous data download device to the location determined to be suitable for transmission of the data comprises the steps of:
    navigating the autonomous data download device to a predetermined safe travel location inside the mobile vehicle in response to detecting motion of the mobile vehicle while inside the mobile vehicle; and
    parking the autonomous data download device at the predetermined safe travel location inside the mobile vehicle.

6. The method in accordance with claim 5 wherein the step of navigating the autonomous data download device to location determined to be suitable for transmission of the data further comprises the step of the autonomous data download device, when parked at the predetermined safe travel location inside the mobile vehicle, determining whether the motion of the mobile vehicle is still detected.

7. The method in accordance with claim 6 wherein the step of navigating the autonomous data download device to the location determined to be suitable for transmission of the data further comprises the step of navigating the autonomous data download device to the location determined to be suitable for transmission of the data in response to determining that the motion of the mobile vehicle is not detected.

8. The method in accordance with claim 1, wherein the step of connecting the autonomous data download device to the first data storage device comprises the step of a robotic arm of the autonomous data download device connecting the autonomous data download device to the first data storage device.

9. The method in accordance with claim 8 wherein the step of the robotic arm connecting the autonomous data download device to the first data storage device comprises the step of the robotic arm connecting a USB plug coupled to the robotic arm to a USB socket on the first data storage device.

10. The method in accordance with claim 1 wherein the step of downloading the data from the first data storage device to the autonomous data download device comprises the steps of:
    verifying that the autonomous data download device is authorized to download the data from the first data storage device;
    downloading the data from the first data storage device to the autonomous data download device in response to determining that the autonomous data download device is authorized to download the data from the first data storage device; and
    disconnecting the first data storage device from the autonomous data download device in response to determining that the autonomous data download device is not authorized to download the data from the first data storage device.

11. An autonomous data download device for downloading data from a first data storage device in a mobile vehicle, the autonomous data download device comprising:
    a drive mechanism for propelling the autonomous data download device, the drive mechanism including a steering mechanism for navigating the autonomous data download device within the mobile vehicle;
    a location sensing device for determining a location of the autonomous data download device within the mobile vehicle and generating a location signal in response thereto;
    a controller for providing a drive signal to the drive mechanism for propelling the autonomous data download device, the controller further coupled to the location sensing device for generating a steering signal in response to the location signal and predetermined route data, the controller providing the steering signal to the steering mechanism of the drive mechanism;
    a memory for storing downloaded data; and
    a data connection device for coupling the memory to the first data storage device, wherein the controller provides a connection signal to the data connection device for coupling the data connection device to the first data storage device and thereafter downloads the downloaded data from the first data storage device to the memory of the autonomous data download device.

12. The autonomous data download device in accordance with claim 11 further comprising:
    a motion detection device for detecting movement of the mobile vehicle and generating a vehicle movement signal in response thereto; and
    power control circuitry for controlling power supplied to the drive mechanism and the location sensing device, wherein the controller is coupled to the motion detection device and provides the steering signal to the steering mechanism to navigate the autonomous data download device to a predetermined safe travel location inside the mobile vehicle in response to the vehicle movement signal indicating that the motion detection device has detected movement of the mobile vehicle while the autonomous data download device is being propelled within the mobile vehicle, the controller further coupled to the power control circuitry for conserving power by providing a power save signal to the power control circuitry for turning off the drive mechanism and the location sensing device to park the autonomous data download device at the predetermined safe travel location inside the mobile vehicle while the vehicle movement signal indicates that the motion detection device detects movement of the mobile vehicle.

13. The autonomous data download device in accordance with claim 11 wherein the data connection device comprises a robotic arm including an external device plug, wherein the data connection device maneuvers the robotic arm to connect the external device plug to the first data storage device in response to the connection signal from the controller.

14. The autonomous data download device in accordance with claim 13 wherein the external device plug is a universal serial bus (USB) connector.

15. The autonomous data download device in accordance with claim 11 further comprising transceiver circuitry for transmitting the downloaded data from the memory to a second data storage device, wherein the controller generates a transmission signal in response to determining that the autonomous data download device has reached a location determined to be suitable for transmission of the downloaded data, the controller providing the transmission signal to the power control circuitry for activating the transceiver circuitry and the controller thereafter retrieving the downloaded data from the memory and providing appropriate signaling to the transceiver circuitry for transmitting the downloaded data to the second data storage device.

16. A system for autonomous data download from a first data storage device in a mobile vehicle to a second storage device external to the mobile vehicle, the system comprising:
   the mobile vehicle including a predetermined travel path and the first data storage device;
   the second data storage device external to the mobile vehicle; and
   an autonomous data download device for autonomously retrieving data from the first data storage device and providing the data to the second storage device, the autonomous data download device comprising:
      a drive mechanism including a steering mechanism for navigating the autonomous data download device along the predetermined path within the mobile vehicle;
      a location sensing device for recognizing the predetermined path and for determining a location of the autonomous data download device within the mobile vehicle relatively to or on the predetermined path and generating a location signal in response thereto;
      a controller for providing a drive signal to the drive mechanism for propelling the autonomous data download device, the controller further coupled to the location sensing device for generating a steering signal in response to the location signal and predetermined route data, the controller providing the steering signal to the steering mechanism of the drive mechanism;
      a memory for storing the data; and
      a data connection device for coupling the memory to the first data storage device,
      wherein the controller provides a connection signal to the data connection device for coupling the data connection device to the first data storage device and thereafter downloads the data from the first data storage device to the memory of the autonomous data download device.

17. The system in accordance with claim 16 wherein the mobile vehicle further comprises a predetermined safe travel location therein, and wherein the autonomous data download device further comprises:
   a motion detection device for detecting movement of the mobile vehicle and generating a vehicle movement signal in response thereto; and
   power control circuitry for controlling power supplied to the drive mechanism and the location sensing device,
wherein the controller is coupled to the motion detection device and provides the steering signal to the steering mechanism to navigate the autonomous data download device to the predetermined safe travel location in response to the vehicle movement signal indicating that the motion detection device has detected movement of the mobile vehicle while the autonomous data download device is being propelled within the mobile vehicle, the controller further coupled to the power control circuitry for conserving power by providing a power save signal to the power control circuitry for turning off the drive mechanism and the location sensing device to park the autonomous data download device at the predetermined safe travel location while the vehicle movement signal indicates that the motion detection device detects movement of the mobile vehicle.

18. The system in accordance with claim 16 wherein autonomous data download device further comprises transceiver circuitry for wirelessly transmitting the data from the memory to the second data storage device, wherein the controller generates a transmission signal in response to determining that the autonomous data download device has reached a location determined to be suitable for transmission of the data, the controller providing the transmission signal to the power control circuitry for activating the transceiver circuitry and the controller thereafter retrieving the data from the memory and providing appropriate signaling to the transceiver circuitry for transmitting the data to the second data storage device.

19. The system in accordance with claim 16 wherein the data connection device comprises a robotic arm including an external device plug, wherein the data connection device maneuvers the robotic arm to connect the external device plug to the first data storage device in response to the connection signal from the controller, and wherein the first data storage device includes an external device socket and, after determining that the external device plug is connected to the external device socket, verifies that the autonomous data download device is authorized to download the data from the first data storage device, the first data storage device further downloading the data therefrom to the autonomous data download device in response to determining that the autonomous data download device is authorized to download the data from the first data storage device and disconnecting the first data storage device from the autonomous data download device in response to determining that the autonomous data download device is not authorized to download the data from the first data storage device.

20. The system in accordance with claim 16 wherein the mobile vehicle is an airplane.

* * * * *